2,790,720

FOOD PRESERVATION

Leo J. Novak, Dayton, Ohio, assignor to The Commonwealth Engineering Company of Ohio, Dayton, Ohio, a corporation of Ohio No Drawing. Application December 18, 1953, Serial No. 399,165

8 Claims. (Cl. 99—150)

This invention relates to food products and to a method of handling the same. More specifically, it relates to improvements in connection with frozen foods.

It is well known that while refrigeration delays the onset of decay and the development of bad taste and odor in various foodstuffs, some foodstuffs take on these characteristics even when frozen and during storage in the frozen state will also tend to discolor. Moreover, when such foodstuffs are thawed, further discoloration and deterioration often set in very rapidly.

Heretofore, it has been attempted to avoid the deterioration of various frozen foods during storage or after thawing by treating them, before they are frozen, with various protective coating materials. These prior art measures have not been entirely satisfactory. For instance, in the case of fish the prior art coatings have failed to retard, to the commercially necessary degree, the development of rancidity. It is known that when mackerel fillets are coated with a solution of Irish moss extractive, a coating material previously proposed for this purpose, and the coated fillets are frozen and stored in the frozen state, the stored fillets become so rancid after five months storage that they can no longer be eaten. As a matter of fact, and as is known, fatty fish are particularly troublesome to processors wishing to freeze the fish in season and store it for sale at a later time. The explanation for this loss of quality and acceptability as food during storage of the fish is the development of rancidity in the fat and flesh of the fish and in the fish oil, more particularly in those portions exposed to the air. In an effort to minimize the surface oxidation resulting in rancidity, some kinds of fish, notably mackerel, have been frozen in the round. Even when so processed objectionable rancidity is observed in a few months storage time. Freezing in the round is not the preferred method, however, as it is more economical to store fish as fillets rather than the whole fish. Moreover, fillets have more sales appeal, the only objection to them in the trade being that up to now it has not been advisable to store them for more than three months, a period of time too short for profitable commercial operations.

Coating the fish with such anti-oxidants as ascorbic acid, ethyl, n-propyl, n-butyl and hexyl gallates, sodium gallate, citric acid and tartaric acid, prior to freezing it, has also been tried, but none of these materials, applied by dipping, usually, has been found to prevent development of rancidity after more or less prolonged storage of the coated fish.

Fish are not the only comestible which, when frozen, become unusable during storage or after thawing. Other frozen foods are subject to deterioration, also. For example, frozen spinach is subject to very rapid decay on thawing and in fact it is recommended by the suppliers that most frozen vegetables and meats should be used as soon as possible after thawing sets in so that the deterioration will be avoided as far as possible.

One object of this invention is to improve the keeping qualities of foodstuffs during storage at reduced temperature.

Another object is to prolong the freshness of frozen foodstuffs during storage thereof in the frozen state of the frozen product.

Another object is to effect the preservation of the foodstuff by means of a protective agent which is physiologically harmless and may be allowed to remain on the food when it is cooked and thereafter eaten.

These and other objects are accomplished by coating foodstuffs to be preserved by freezing with dextran before they are subjected to the freezing temperature.

The dextrans are high molecular weight polysaccharides made up of anhydroglucopyranosidic units and characterized in that the units are linked together by molecular structural repeating alpha- 1,6 to non-alpha- 1,6 linkages, at least 50% of these linkages being, apparently, of the alpha- 1,6 type.

The dextrans vary widely in their properties including molecular weight, molecular structural repeating alpha- 1,6 to non-alpha- 1,6 linkages ratios, and sensitivity to water. Those useful for the present purpose of preserving frozen foodstuffs and delaying deterioration even after thawing of the food, without loss in the nutrient or food value thereof, may have a molecular weight of 5000 to $150 \times 10^6$, as determined by light scattering measurements, a molecular structural repeating alpha- 1,6 to non-alpha- 1,6 linkages ratio of 1.9:1 to 30:1, and form stable aqueous solutions or suspensions of from 0.5% to 50% by weight concentration.

These dextrans may be obtained in various ways and are usually obtained by enzymatic synthesis from sucrose in the presence or substantial absence of bacteria and cellular debris. Thus, a dextran-producing microorganism, such as those of the *Leuconostoc mesenteroides* and *L. dextranicum* types may be cultured on a medium containing acclimating dextran and the culture may be inoculated into a nutrient medium containing sucrose and appropriate inorganic salts and nitrogenous material, the mass being incubated until the dextran is synthesized in maximum yield. This is "whole culture" synthesis effected in the presence of the bacteria and cellular debris. Or the culture of the microorganism may be filtered to obtain a filtrate containing the enzyme dextransucrase and the filtrate, the enzyme isolated therefrom, or an aqueous solution of the isolated enzyme may be introduced into the sucrose-bearing nutrient, the mass being held until the dextran is produced. This is "filtered enzyme" synthesis effected in the substantial absence of bacteria and cellular debris.

In either method, the native dextran obtained, separable from the fermentate or medium by the addition of a suitable non-solvent precipitant such as a water-miscible aliphatic alcohol or ketone, has a very high molecular weight usually in the millions, and may be readily soluble in water, soluble therein under special conditions or more or less substantially water-insoluble, depending on the microorganism used, which also determines, apparently, the molecular structural repeating alpha- 1,6 to non-alpha- 1,6 linkages ratios. Thus, the native dextrans from the microorganisms (or their enzymes) bearing the NRRL classifications: *Leuconostoc mesenteroides* B–119, B–512, B–1146 and B–1190 are smooth, lustrous elastic gums, readily soluble in water to give clear or relatively clear solutions. After suitable purification, drying and, preferably, reduction to particulate condition, they may be dissolved in water to obtain a coating or impregnating solution of suitable concentration, e. g., containing 0.5% to 3.0% of the dextran by weight and adapted to be sprayed on or otherwise applied to foodstuffs destined to be frozen.

Dextran obtained by use of the microorganism *Leuco-*

*nostoc mesenteroides* B-1144 (NRRL) is a crumbly gum that, if isolated from the crude precipitate by lyophilization, can be dissolved in water added at a slow rate and with agitation to disperse gelatinous lumps followed, usually, by autoclaving. Solutions so prepared may be used in the practice of this invention, as may, also, solutions of the tough gum dextran from *Leuconostoc mesenteroides* B-1384 (NRRL) prepared by adding an aqueous paste of the dextran to ethanol to isolate the dextran and then slowly adding water to the dextran with agitation and final autoclaving. The substantially water-insoluble dextrans such as those from the NRRL microorganisms (or their enzymes) *Leuconostic mesenteroides* B-742, B-119, B-1196, B-1208, B-1216, B-523; *Streptobacterium dextranicum* B-1254 and *Betabacterium vermiforme* B-1139, may also be used in the form of their aqueous dispersions or suspensions. In the preferred embodiment, however, the readily soluble dextrans are used. These may be the readily water-soluble native dextrans of high molecular weight described above or products of lower molecular weight obtained by partial hydrolysis of the native dextrans, including so-called "clinical" dextran and the low fraction of conventional "clinical" dextran production having molecular weight of about 5000 to 50,000 and normally discarded as waste.

The solutions or dispersions may be applied to the foodstuffs by dipping, spraying or flotation, followed by drying of the coated foodstuff to leave thereon a continuous, adhesive protective dextran film. Where practical, as in treating fish fillets, the food is dipped into the dextran solution and then allowed to drain to remove the excess solution. The coating composition may contain other adjuvants. For example, it may contain, advantageously, a small amount (1-2 parts/million to 1-2 parts/hundred) of an antibiotic.

The coated foodstuff may be packaged for cold storage or for "quick freezing" and storage in the frozen state. For example, in treating fish, the fish as soon as possible after capture may be treated with an aqueous 3% solution of dextran, such as *L. m.* native B-512 dextran, preferably containing an antibiotic such as aureomycin or terramycin, as by spraying or immersion, and then iced in the usual way. The dextran serves as protective coating for the fish and as a carrier which holds the antibiotic in contact with the fish. This procedure lengthens the storage life of the freshly caught fish by at least six months.

In treating spinach and other leafy green vegetables, fresh fruit, and the like, the produce may be coated with dextran solution containing the antibiotic, such as streptomycin, immediately before packaging for cold storage, for instance in commercial type plastic film bags.

The coated foodstuff may be "quick frozen," and the present invention is more specifically concerned with frozen foodstuffs. In accordance with the invention, as applied to fruits and vegetables, these are first weighed and washed and, after thorough inspection, separated into desired sizes, graded according to size and color, and the undesired items culled out. If desired, salt may be added, as in the case of lima beans, string beans, peas or lentils, at this stage or later. The fruits or vegetables are then quickly steamed or blanched to destroy the enzymes suspected of inducing decay, and for holding color and partially cooking the food. Thereupon the food is sprayed or otherwise treated, as by flotation, with the dextran solution or suspension, dried, packaged and frozen. If salt has not been applied to the food earlier, or even if a certain proportion of salt has been applied, the dextran solution may contain salt as well as the small proportion of antibiotic. With berries and similar fruit, the salt is usually omitted. It will be understood that the various expedients sometimes employed in handling these foods incidental to quick-freezing them may be used, such as hot lye dip for removing the skins from the fruit, as may be desirable in the case of peaches or apricots, or a hot water dip for removing the skins of tomatoes. When green leafy vegetables are to be coated with the dextran solution and then quick-frozen, the vegetables are first processed in the usual way, that is the leaves which do not come up to standard may be culled out and the remaining leaves, with or without blanching to preserve color, and sizing off, are coated with the dextran solution, containing the antibiotic or not, dried, packaged and quickly frozen.

As applied to fish, the complete procedure may involve first filleting the fish, washing the fillets, draining them, weighing them, dipping them into dextran solution containing antibiotic or not, draining off the excess, and then wrapping, packaging and freezing. Meats and poultry, after appropriate dressing and weighing, may be coated with the dextran solution desirably but not necessarily containing the small amount of antibiotic, the excess solution removed, and the meat frozen.

Foodstuffs treated with the dextran solution, with or without an antibiotic present therein, and then frozen remain of high quality even after prolonged storage, and up to a year or more, in the frozen state. The frozen foodstuffs retain their flavor even after prolonged storage required for shipping and marketing thereof.

The dextrans, being resistant to bacterial or enzymatic degradation under normal conditions, are particularly satisfactory agents as protectives for foodstuffs. Being bland, non-toxic materials which are assimilable without harmful physiological effect, they may be consumed with the food if desired, for instance dissolved in the water in which the food is cooked. Whether readily or only difficultly if at all soluble in water, the dextrans are generally hydrophilic in character and capable of adsorbing and retaining moisture in varying amounts depending on the dextran. If the frozen foodstuff carrying the protective dextran film is allowed to stand in partially or even completely thawed condition, the dextran tends to absorb and hold the water, which assists in retarding the onset of decay.

It will be understood from the foregoing discussion that dextrans other than *L. m.* native B-512 may be used in making up the treating composition and although solutions or dispersions of 0.5% to 3.0% concentration have been mentioned, higher dextran concentrations up to, say, about 10% or even more, may be used. Antibiotics other than those mentioned may also be used in small amounts as stated. Since all of these changes and modifications may be made without departing from the spirit and scope of the invention, it is to be understood that the invention is not to be limited except as defined in the appended claims.

I claim:

1. The method of preserving food which comprises the step of contacting the food with a medium consisting essentially of an aqueous dispersion of dextran containing from about 1-2 parts per million parts of the dispersion to 1-2 parts per hundred parts of the dispersion of an antibiotic, said dextran having a molecular weight between 5000 and that of native, unhydrolyzed dextran.

2. The method of preserving fish which comprises the step of contacting the fish with a medium consisting essentially of an aqueous dispersion of dextran containing from about 1-2 parts per million parts of the dispersion to 1-2 parts per hundred parts of the dispersion of an antibiotic, said dextran having a molecular weight between 5000 and that of native, unhydrolyzed dextran.

3. The method of preserving fish which comprises the step of contacting the fish with a medium consisting essentially of an aqueous dispersion of dextran containing from about 1-2 parts per million parts of the dispersion to 1-2 parts per hundred parts of the dispersion of aureomycin, said dextran having a molecular weight between 5000 and that of native, unhydrolyzed dextran.

4. The method of preserving fish which comprises the steps of contacting the fish with a medium consisting essentially of an aqueous dispersion of dextran containing from about 1–2 parts per million parts of the dispersion to 1–2 parts per hundred parts of the dispersion of an antibiotic, said dextran having a molecular weight between 5000 and that of native, unhydrolyzed dextran, and then quick-freezing the fish.

5. The method of preserving fresh spinach which comprises the step of contacting the spinach with a medium consisting essentially of an aqueous dispersion of dextran containing from about 1–2 parts per million parts of the dispersion to 1–2 parts per hundred parts of the dispersion of streptomycin, said dextran having a molecular weight between 5000 and that of native, unhydrolyzed dextran.

6. The method of preserving food which comprises the steps of contacting the food with a medium consisting essentially of an aqueous dispersion of dextran containing from about 1–2 parts per million parts of the dispersion to 1–2 parts per hundred parts of the dispersion of an antibiotic, said dextran having a molecular weight between 5000 and that of native, unhydrolyzed dextran, and then quick-freezing the food.

7. The method of preserving food which comprises the step of contacting the food with a medium consisting essentially of an aqueous dispersion of native, unhydrolyzed dextran containing from about 1–2 parts per million parts of the dispersion to 1–2 parts per hundred parts of the dispersion of an antibiotic.

8. The method of preserving food which comprises the steps of contacting the food with a medium consisting essentially of an aqueous dispersion of native, unhydrolyzed dextran containing from about 1–2 parts per million parts of the dispersion to 1–2 parts per hundred parts of the dispersion of an antibiotic, and then quick-freezing the food.

References Cited in the file of this patent

UNITED STATES PATENTS

| | | |
|---|---|---|
| 2,089,217 | Mahoney | Aug. 10, 1937 |
| 2,203,705 | Stahly et al. | June 11, 1940 |
| 2,229,941 | Stahly et al. | Jan. 28, 1941 |
| 2,518,135 | Gaver | Aug. 8, 1950 |

OTHER REFERENCES

"Food Industries," October 1950, page 126, article entitled, Antibiotics Effectively Retard Bacterial Spoilage of Fish.